United States Patent [19]

Le Salver et al.

[11] Patent Number: 4,618,127
[45] Date of Patent: Oct. 21, 1986

[54] CONNECTING DEVICE BETWEEN THE STRUCTURE OF A VEHICLE AND A SUSPENSION STRUT

[75] Inventors: Robert Le Salver, Chanteloup les Vignes; Dominique Poupard, Chaville, both of France

[73] Assignees: Automobiles Peugeot, Paris; Automobiles Citroen, Neuilly-sur-Seine, both of France

[21] Appl. No.: 609,880

[22] Filed: May 14, 1984

[30] Foreign Application Priority Data

May 16, 1983 [FR] France ................................ 83 08089
Nov. 23, 1983 [FR] France ................................ 83 18657

[51] Int. Cl.[4] .......................... B60G 15/06; F16F 9/54
[52] U.S. Cl. .................................. 267/8 R; 267/63 A;
267/33; 188/321.11
[58] Field of Search .................. 267/63 A, 63 R, 8 R,
267/33, 34, 35, 20 A, 152, 153, 21 R;
188/321.11; 280/668

[56] References Cited

U.S. PATENT DOCUMENTS

| 4,260,177 | 4/1981 | Pflughaupt et al. | 267/33 |
| 4,274,655 | 6/1981 | Lederman | 267/8 R |
| 4,434,977 | 3/1984 | Chiba et al. | 267/8 R |
| 4,477,061 | 10/1984 | Kawaura et al. | 267/8 R |

FOREIGN PATENT DOCUMENTS

| 0821886 | 12/1951 | Fed. Rep. of Germany | 267/152 |
| 2745380 | 4/1979 | Fed. Rep. of Germany | 267/33 |
| 3214586 | 11/1982 | Fed. Rep. of Germany | |
| 2272857 | 12/1975 | France | |

Primary Examiner—Bruce H. Stoner, Jr.
Assistant Examiner—Alvin Oberley
Attorney, Agent, or Firm—Burns, Doane, Swecker & Mathis

[57] ABSTRACT

An abutment element 11 is fixed to the upper element 7 of the suspension strut below the flexible joint 5 which connects the upper element to the structure 1 of the vehicle. This abutment element cooperates, in order to limit the "relaxation" movements, with a support element 12 disposed below the abutment element and connected to the structure. Such an arrangement facilitates the placement of a hydraulic device 6 above the flexible joint 5. Application in motor vehicle suspensions.

15 Claims, 7 Drawing Figures

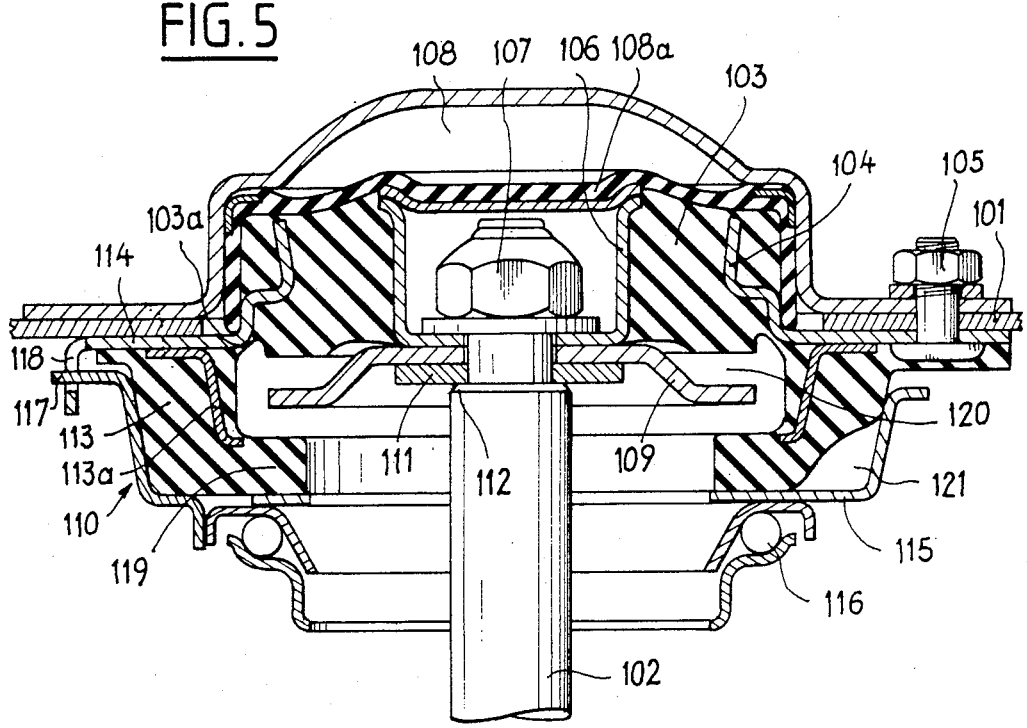
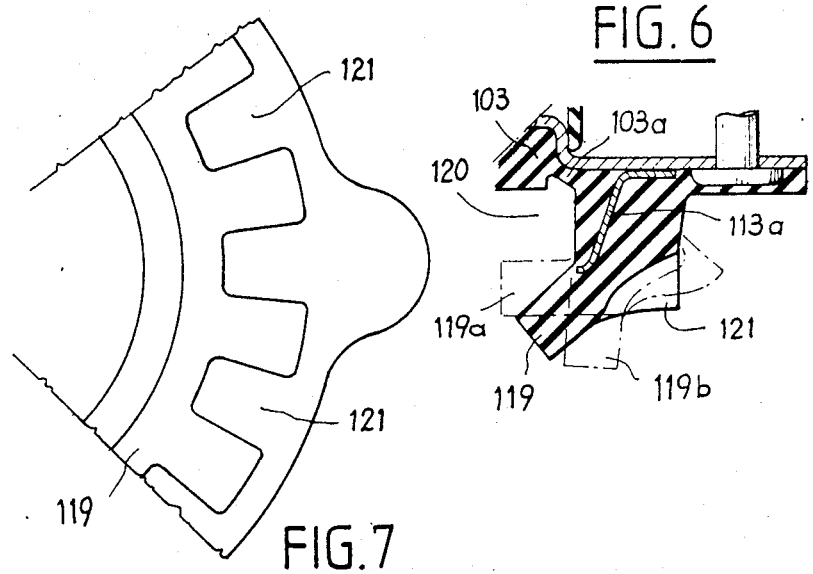

CONNECTING DEVICE BETWEEN THE STRUCTURE OF A VEHICLE AND A SUSPENSION STRUT

FIELD OF THE INVENTION

The invention relates to means providing a connection between the structure of a motor vehicle and the upper end of a telescopic suspension strut associated with one of the wheels of the vehicle. In order to filter the vibrations transmitted from the wheel to the structure, these means advantageously include a flexible joint which is disposed coaxially of the strut and formed by a sleeve of an elastomer bonded between an outer frame fixed to the structure and an inner frame fixed to the end of an upper element of the strut. This element may be the piston rod of a shock absorber which is part of the suspension strut.

As a result of the variable vertical forces applied to the suspension strut, the sleeve is deformed and, in order to limit the upward axial travel ("attack") and the downward travel ("relaxation") between the rod and the structure, said connecting means further comprise preferably at least one cup which is coaxial with the strut and fixed to its rod above the flexible joint, this cup being wide enough to bear against the structure around the sleeve, or on the latter, in the vicinity of its periphery, or on the outer frame.

As this cup is located above the joint, this constitutes a drawback, particularly when a hydraulic device, such as a chamber including a diaphragm, must be placed in this region, as disclosed in, for example, the patent FR-A No. 2,272,857.

SUMMARY OF THE INVENTION

An object of the invention is to provide, between the structure of the vehicle and the upper end of a telescopic suspension strut, a connecting device having a flexible joint which is associated with means for limiting the axial movement and which does not encumber the region above the joint.

The invention therefore provides a connecting device comprising a flexible joint of the type comprising a resiliently yieldable sleeve disposed between two frames, respectively fixed to an upper element of the suspension strut and to the structure, and an abutment element fixed to said upper element and cooperating with at least one support element connected to the structure, wherein the abutment element is fixed to the upper element of the suspension strut below the flexible joint and the support element connected to the structure is disposed below said abutment element.

According to other advantageous features of the invention:

said abutment element is maintained axially on the upper element of the suspension strut between a shoulder on the upper element and the frame which is fixed thereto, for example by means of a screwthreaded member which cooperates with the upper end of said upper element;

the peripheral portion of the sleeve acts as an upper support surface for the abutment element;

the support element includes a part of elastomer capable of cooperating with said abutment element and fixed to at least one upper frame;

the elastomer part of the support element and its upper frame are respectively formed by extensions of the sleeve and of its outer frame;

in the latter case, the abutment element is a transverse bar, which extends through a radial opening in the support element;

a chamber of a hydraulic device is located above the flexible joint and includes a diaphragm which bears against the upper surface of the sleeve, and the member fixing the latter to the upper element of the suspension strut has a flat head engaged in a cavity of substantially complementary shape formed in the lower surface of the diaphragm;

the upper element of the suspension strut carries two abutment elements between which the support element connected to the structure is disposed with axial clearance.

In a cheap embodiment which nonetheless has optimum reliability, the support element includes a ring of elastomer which is coaxial with the suspension strut, bonded in its upper part to an annular flange extending the frame fixed to the structure and disposed in its lower part in a cup which is axially maintained with a slight freedom of movement relative to the flange, the ring having a lower inner flange which is downwardly inclined in the free state and maintained deformed in a substantially radial position by cooperation with the cup.

BRIEF DESCRIPTION OF THE DRAWINGS

Some embodiments of a connecting device according to the invention will be described hereinafter with reference to the accompanying drawings, in which:

FIG. 5 is an axial sectional view of a modification of the device;

FIG. 6 is a partial axial section of an element of the device shown in FIG. 5 in the state of rest, and FIG. 7 is a partial top plane view thereof.

DESCRIPTION OF EMBODIMENTS

Figure 1:
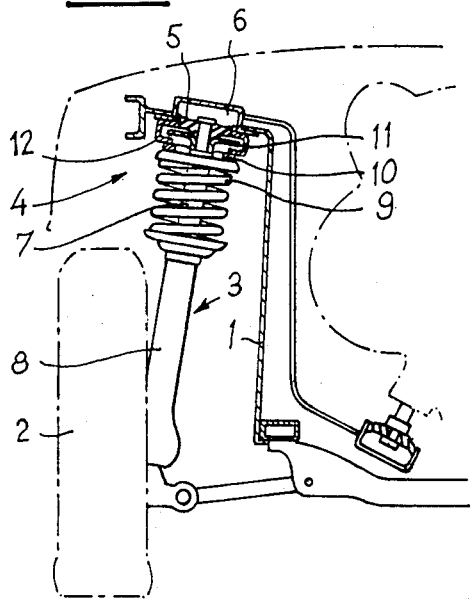
FIG. 1 is a simplified partial axial sectional assembly view of the device provided on a motor vehicle.

FIG. 1 shows a part of the structure 1 of a vehicle, a steering wheel 2 and a telescopic suspension strut 3 connecting the wheel 2 to the structure 1. A connecting device 4 having a flexible joint 5 provides a connection between the upper part of the suspension strut and the structure 1. A chamber 6 of a hydraulic device, in accordance with that disclosed in the patent FR-A No. 2,272,857, is interposed between the flexible joint and the structure 1.

The suspension strut includes a hydraulic shock absorber formed by an upper rod 7 and a lower tubular element 8. A suspension coil spring 9 disposed around the rod 7 bears against a cup connected to the tube 8 and against the structure 1 through an axial thrust bearing 10 allowing a rotation of the element 8 about its axis.

According to the invention, a rigid abutment element 11 extending transversely relative to the axis of the rod 7 is fixed to the latter below the joint 5 and is adapted to abut downwardly against a support ring 12 fixed to the structure 1.

Figure 2:
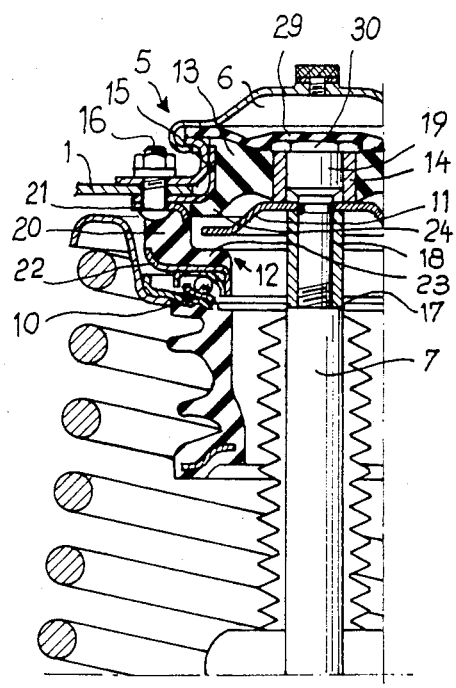
FIGS. 2, 3 and 4 are partial axial sectional views of three embodiments of the device.

FIG. 2 shows in detail the connecting device 4 of FIG. 1. The flexible joint 5 is formed by a sleeve 13 of elastomer bonded between a tubular inner frame 14 coaxial with the rod 7, and an annular outer frame 15 fixed to the structure 1 by bolts 16. The rigid element 11 is, in the presently-described embodiment, a cup which is coaxial with the rod and clamped between the frame 14 and a shoulder 17 of the rod, with interposition of a spacer member 18, by means of a screwthreaded member 19 screwthreadedly engaged in the upper tapped end portion of the rod. The support ring 12 has a central part 20 of elastomer, an annular upper frame 21 fixed to the structure by bolts 16, and a lower frame 22 carrying the bearing 10. The cup 11 is interposed with axial clearance between an inner shoulder 23 of the support ring and an outer lower flange 24 of the sleeve 13.

This clearance allows the rod 7 to move axially relative to the structure. This movement is limited downwardly by abutment of the cup against the shoulder 23 and upwardly by abutment of the cup 11 against the flange 24 of the sleeve. The cup 11 therefore performs the function of a "relaxation" (downward) abutment and an "attack" (upward) abutment.

Figure 3:
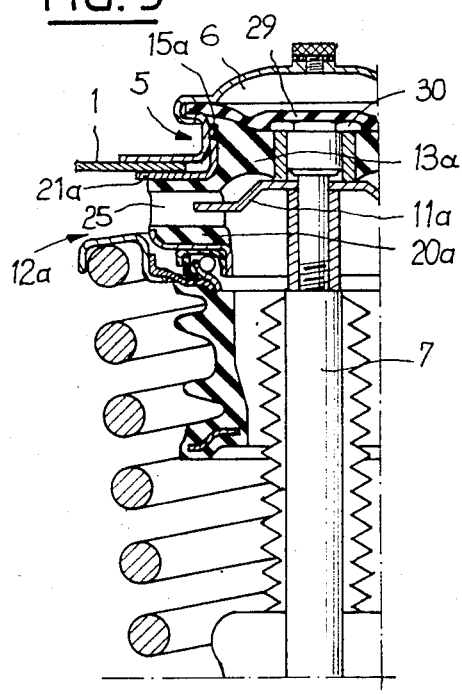

In the embodiment shown in FIG. 3, the support ring 12a constitutes a lower extension of the joint 5, the central port 20a of elastomer of the ring being made in one piece with the sleeve 13a, as the sleeve 13 described before, and a lower flange 21a of the outer frame 15a of the sleeve acts as an upper frame for the support ring. The rigid abutment element is in the presently described embodiment a bar 11a fixed to the rod 7, as the cup 11 of the previous embodiment. Each end of this bar is engaged with an axial clearance in one of two opposed radial openings 25 formed in the central part 20a of the ring. The axial movements of the rod relative to the structure 1 are here limited by upward or downward abutment of the end portions of the bar against the upper or lower surface of each opening 25. The bar 11a therefore performs the function of an attack or relaxation abutment.

Figure 4:
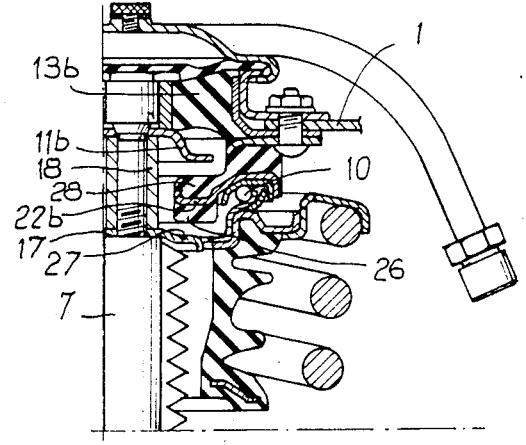

FIG. 4 shows a modification which differs from the arrangement shown in FIG. 2 in the following respects: the sleeve 13b does not have a lower flange 24; an elastomer ring 26 covers the lower surface of the lower frame 22b in a region radially within the bearing 10; and a second cup 27 coaxial with the rod 7 is clamped between the shoulder 17 and the spacer member 18 so that the lower inner portion 28 of the support ring is interposed with axial clearance between the two cups 11b and 27. The axial movements of the rod 7 relative to the structure 1 are here limited upwardly ("attack") by abutment of the second cap 27 against the ring 26 and downwardly ("relaxation") by abutment of the cup 11b against the upper surface of the inner portion 28 of the support ring. This embodiment is particularly compact radially.

In all the embodiments described hereinbefore, a chamber 6 of a hydraulic device is defined by a diaphragm 29 applied against the upper surface of the flexible joint 5. For this purpose, the screwthreaded member 19 fixing the sleeve 13, 13a, 13b to the rod 7 has a flat head 30 engaged in a cavity of complementary shape formed in the lower surface of the diaphragm so that the latter does not deteriorate over a period of time owing to the axial movements of the rod relative to the structure. Such an arrangement thus affords an improved reliability relative to conventional devices in which a cup which limits the relaxation is located above the flexible joint. This advantage is moreover achieved without increasing the overall size in this region and with no complication of the means employed.

FIG. 5 shows a connecting device resiliently connecting to a part 101 of the structure of a vehicle the upper part of a sliding rod 102 of a suspension strut associated with a wheel of the vehicle.

The device comprises a flexible joint including a sleeve 103 of an elastomer bonded to an outer frame 104 fixed to the structure by bolts 105 and to an inner frame 106 fixed to the screwthreaded end portion of the rod 102 by a nut 107. Above the flexible joint there is provided a chamber 108 which is maintained by bolts 105 and is part of a hydraulic device including a circular diaphragm 108a directly applied against the upper surface of the sleeve 103.

The device further comprises, on one hand, an abutment element 108 formed by a disc through the centre of which extends the end portion of the rod 102 to which it is fixed by the nut 107 and, on the other hand, a support element 110 connected to the structure and capable of cooperating with the lower surface of the disc 109. The latter is welded to the inner frame 106 and made to bear, by the nut 107 and a washer 111, against a shoulder 112 of the rod 102.

The support element 110 includes a ring 113 of elastomer coaxial with the rod 102, bonded in its upper part to an annular flange 114 which extends the frame 104, and disposed in its lower part in a cup 115 in the form of a dish having an opening in its centre and an upwardly-facing concavity. This cup acts as an upper support, through a rolling bearing 116, for a coil spring (not shown) surrounding the rod 102. The outer and upper edge of the cup 115 is provided with radially extending tabs 117 which are hooked with a slight clearance in the axial direction in apertured and bent strips 118 provided on the periphery of the flange 114 so as to maintain the cup upwardly against the ring 113 and allow, while limiting them, the relative axial displacements between the cup and the flange so as to allow the ring 113 to filter vibrations transmitted from the spring to the structure.

The ring 113 is connected to the sleeve 103 through a circular common lip portion 103a so that the ring constitutes an extension of the sleeve, the two parts being moulded together. A metal ring 113a welded to the flange 114 is inserted in the ring 113 so as to stiffen it in the transverse direction.

The ring 113 has in its lower part an inner flange 119 which is downwardly inclined when the ring 113 is in the free state, as shown in FIG. 6, but which is maintained deformed in a substantially radial position when the cup 115 is placed in position, as seen in FIG. 5. The inside diameter of the flange 119 is then, as the diameter of the cup 115, less than the outside diameter of the disc 108 which is trapped in the space 120 inside the ring 113 axially defined by the flange 119 and the sleeve 103.

The ring 113 further comprises, evenly spaced apart on its lower outer periphery, cavities 121 which render this part of the ring more flexible and facilitate the deformation of the flange. The latter is shown in FIG. 6 in dot-dash lines in the radial position of utilisation 119a, and in the spread-apart position 119b in which it has a shape cloe to a cylindrical shape and allows not only the stripping of a core which fills the space 120 when the ring 113 and the sleeve 103 are being produced, but also the engagement of the disc 109 in the space 120 before it is welded to the frame 106.

This device is relatively cheap since it permits the simultaneous production of the joint including the sleeve 102 and the ring 113 of the support element 110 and avoids the bonding of the cup 115, while, owing to its assembly by deformation of the flange 119, the abutment element 109 may be made circular and cooperates throughout its periphery with the support element 110, 119, 115 in a particularly reliable manner.

What is claimed is:

1. A connecting device combined with and interposed between a structure of a vehicle and an upper element of a suspension strut which upper element is movable substantially along an axis relative to said structure, said device comprising a flexible joint including two frames, one of which frames is fixed to said upper element of the suspension strut while another of said frames is fixed to said structure, a resiliently yieldable sleeve interposed between and fixed to said two frames, said two frames being such as to allow said yieldable sleeve to undergo solely shear stress upon said movement of said upper element relative to said structure, a support element fixed to said structure, and an abutment element fixed to said upper element and cooperative with said support element, said abutment element being fixed to said upper element of the suspension strut below said flexible joint in spaced relation to said yieldable sleeve axially of said upper element, and said support element being disposed below said abutment element in spaced relation to said abutment element axially of said upper element so as to limit the downward movement of said abutment element and said upper element after a free travel of said abutment element relative to said support element in normal operation of the device.

2. A device according to claim 1, wherein said abutment element is axially maintained on said upper element between a shoulder of said upper element and said frame fixed to said upper element.

3. A device according to claim 2, wherein a screwthreaded member screwthreadedly engaged on an end portion of said upper element of the suspension strut maintains said abutment element.

4. A device according to claim 1, wherein said support element includes a central part of elastomer, an upper frame fixed to said structure and a lower frame.

5. A device according to claim 1, wherein said resiliently yieldable sleeve defines a lower support surface for supporting said abutment element in an upward movement thereof relative to said yieldable sleeve.

6. A device according to claim 1, comprising a bearing carried by said support element for providing an axial support for a spring surrounding the suspension strut.

7. A device according to claim 1, comprising a chamber of a hydraulic device substantially coaxial with and disposed above said flexible joint and including a diaphragm in axial bearing relation to an upper surface of said sleeve, a member disposed within said sleeve for fixing said sleeve to said upper element of the suspension strut and comprising a flat head portion in retaining relation to said sleeve and engaged in a cavity in a surface of said diaphragm adjacent to said sleeve.

8. A connecting device combined with and interposed between a structure of a vehicle and an upper element of a suspension strut which upper element is movable substantially along an axis relative to said structure, said device comprising a flexible joint including two frames, one of which frames is fixed to said upper element of the suspension strut while another of said frames is fixed to said structure, a resiliently yieldable sleeve interposed between and fixed to said two frames, said two frames being such as to allow said yieldable sleeve to undergo solely shear stress upon said movement of said upper element relative to said structure, a support element including a central part of elastomer, an upper frame connected to said structure and a lower frame, and an abutment element fixed to said upper element and cooperative with said support element, said abutment element being fixed to said upper element of the suspension strut below said flexible joint in spaced relation to said yieldable sleeve axially of said upper element, and said support element being disposed below said abutment element in spaced relation to said abutment element axially of said upper element so as to limit the downward movement of said abutment element and said upper element after a free travel of said abutment element relative to said support element, said central part of elastomer and said upper frame of said support element being formed by extensions of said resiliently yieldable sleeve and of the frame of said flexible joint which is fixed to said structure, said central part of elastomer defining at least two radial openings in which portions of said abutment element are engaged.

9. A connecting device combined with and interposed between a structure of a vehicle and an upper element of a suspension strut which upper element is movable substantially along an axis relative to said structure, said device comprising a flexible joint including two frames, one of which frames is fixed to said upper element of the suspension strut while another of said frames is fixed to said structure, a resiliently yieldable sleeve interposed between and fixed to said two frames, said two frames being such as to allow said yieldable sleeve to undergo solely shear stress upon said movement of said upper element relative to said structure, a support element connected to said structure, and an abutment element fixed to said upper element and cooperative with said support element, said abutment element being fixed to said upper element of the suspension strut below said flexible joint in spaced relation to said yieldable sleeve axially of said upper element, and said support element being disposed below said abutment element in spaced relation to said abutment element axially of said upper element so as to limit the downward movement of said abutment element and said upper element after a free travel of said abutment element relative to said support element, said upper element of the suspension strut carrying a second abutment element between which first-mentioned abutment element and said second abutment element is substantially coaxially disposed, with an axial clearance, said support element connected to said structure.

10. A connecting device combined with and interposed between a structure of a vehicle and an upper element of a suspension strut which upper element is movable substantially along an axis relative to said structure, said device comprising a flexible joint including two frames, one of which frames is fixed to said upper element of the suspension strut while another of said frames is fixed to said structure, a resiliently yieldable sleeve interposed between and fixed to said two frames, said two frames being such as to allow said yieldable sleeve to undergo solely shear stress upon said movement of said upper element relative to said structure, a support element connected to said structure, and an abutment element fixed to said upper element and cooperative with said support element, said abutment element being fixed to said upper element of the suspension strut below said flexible joint in spaced relation to said yieldable sleeve axially of said upper element, and said support element being disposed below said abutment element in spaced relation to said abutment element axially of said upper element so as to limit the downward movement of said abutment element and said upper element after a free travel of said abutment element relative to said support element, said frame fixed to said structure having an annular flange outwardly extending said frame radially of said upper element, a cup being supported by said annular flange with a small freedom of movement relative to said annular flange axially of said upper element, said support element including a ring of elastomer which is coaxial with said suspension strut, is bonded in an upper portion of said ring to said annular flange extending said frame fixed to said structure, and is disposed in a lower portion of said ring in said cup, said ring of elastomer including a lower inner flange which extends inwardly toward said upper element but is downwardly inclined in a free state of said inner flange and is maintained deformed substantially in a plane perpendicular to said upper element by cooperation with said cup, said inner flange being under and spaced from said abutment element for limiting said downward movement of said abutment element.

11. A device according to claim 10, wherein said ring of elastomer constitutes an extension of said resiliently yieldable sleeve.

12. A connecting device combined with a structure of a vehicle and an upper element of a suspension strut, said device comprising a flexible joint including two frames respectively fixed to said upper element of the suspension strut and to said structure, a resiliently yieldable sleeve interposed between said two frames, at least one support element connected to said structure, and an abutment element fixed to said upper element and cooperative with said support element, said abutment element being fixed to said upper element of the suspension strut below said flexible joint, and said support element being disposed below said abutment element, said frame fixed to said structure having an annular flange extending said frame, a cup being maintained axially with a small freedom of movement relative to said annular flange, said support element including a ring of elastomer which is coaxial with said suspension strut, is bonded in an upper portion of said ring to said annular flange and is disposed in a lower portion of said ring in said cup, said ring of elastomer including a lower inner flange which is downwardly inclined in a free state of said inner flange and is maintained deformed in a substantially radial position by cooperation with said cup, said cup having an upper outer edge portion, said annular flange having on a periphery of the annular flange bent strips and said cup being maintained axially by a hooking assembly with a slight clearance of said upper outer edge in said bent strips.

13. A device according to claim 10, comprising cavities arranged along an outer peripheral portion of said ring of elastomer, so as to render said outer peripheral portion of said ring more flexible and facilitate a deformation of said lower inner flange of said ring of elastomer.

14. A device according to claim 10, wherein said abutment element is circular and disposed within said ring of elastomer axially between said lower inner flange and said sleeve.

15. A device as claimed in claim 14, wherein said abutment element is rigid with said frame connected to said suspension strut.

* * * * *